(12) United States Patent
Croce, Jr.

(10) Patent No.: US 11,415,472 B2
(45) Date of Patent: Aug. 16, 2022

(54) FLEXIBLE BRIDGE SENSOR ELECTRONIC ARCHITECTURE AND METHOD FOR IMPLEMENTING SAME

(71) Applicant: HarcoSemco LLC, Branford, CT (US)

(72) Inventor: Robert A. Croce, Jr., Branford, CT (US)

(73) Assignee: HARCOSEMCO LLC, Branford, CT (US)

( * ) Notice: Subject to any disclaimer, the term of this patent is extended or adjusted under 35 U.S.C. 154(b) by 133 days.

(21) Appl. No.: 16/898,226

(22) Filed: Jun. 10, 2020

(65) Prior Publication Data
US 2021/0389193 A1  Dec. 16, 2021

(51) Int. Cl.
*G01L 1/00* (2006.01)
*G01L 1/22* (2006.01)

(52) U.S. Cl.
CPC .......... *G01L 1/2281* (2013.01); *G01L 1/2262* (2013.01)

(58) Field of Classification Search
CPC .......................... G01L 1/2281; G01L 1/2262
See application file for complete search history.

(56) References Cited

U.S. PATENT DOCUMENTS

| | | | |
|---|---|---|---|
| 8,978,485 B2 * | 3/2015 | Hu ........................ | G02F 1/1337 73/862.55 |
| 9,939,496 B2 * | 4/2018 | Schapendonk ........ | G01R 33/09 |
| 2007/0115047 A1 | 5/2007 | D'Abramo et al. | |
| 2012/0010845 A1 | 1/2012 | Bohan et al. | |
| 2015/0114128 A1 | 4/2015 | Norian et al. | |
| 2016/0377501 A1 * | 12/2016 | Agarwal ............... | G01L 1/2281 73/1.15 |
| 2017/0248483 A1 | 8/2017 | Hilton | |
| 2017/0307458 A1 * | 10/2017 | Landmann ............. | G01D 21/00 |
| 2019/0301955 A1 | 10/2019 | Paradise | |

OTHER PUBLICATIONS

International Patent Application No. PCT/US2021/035177; Int'l Search Report and the Written Opinion; dated Aug. 31, 2021; 15 pages.

* cited by examiner

*Primary Examiner* — Max H Noori
(74) *Attorney, Agent, or Firm* — BakerHostetler

(57) ABSTRACT

A sensor circuit architecture includes a Wheatstone bridge-type sensing element that includes a plurality of resistors and a plurality of equivalent compensation networks. Each of the plurality of resistors includes one of the plurality of equivalent compensation networks. Each of the plurality of equivalent compensation networks includes at least one digital resistive compensation network configured to provide at least one of the following: variable resistance, digitally controlled variable resistance, digitally controlled resistance, and/or digitally set resistance. The sensor circuit architecture is configured with the at least one digital resistive compensation network to implement at least one of the following: a desired scale of output, a desired offset compensation, and/or a desired temperature compensation.

26 Claims, 9 Drawing Sheets

$$\left( \frac{(R1+R2) \times (R3+R4)}{(R1+R2+R3+R4) \times RRef} + 1 \right) \times VRef = Vext$$

$$\left( \frac{R2}{R1+R2} - \frac{R3}{R3+R4} \right) \times (Vext - VRef) = 0 + - 0 -$$

$$\left( \frac{R2}{RRef} \times \frac{R1+R2}{(R1+R2+R3+R4)} + 1 \right) \times VRef = V+$$

$$\left( \frac{R3}{RRef} \times \frac{R3+R4}{(R1+R2+R3+R4)} + 1 \right) \times VRef = V-$$

$$= \left[ \left| \frac{(R4_{X,Y}\|RP4 + R3_{X,Y}\|RP3 + Rs2)\|(Rv\|Rv1 + Rvs)}{(R4_{X,Y}\|RP4 + R3_{X,Y}\|RP3 + Rs2)\|(Rv\|Rv1 + Rvs) + (R1_{X,Y}\|RP1 + R2_{X,Y}\|RP2 + Rs1)} (RP2\|R2_{X,Y} + Rs1) \cdot (I_{EX}) \right. \right.$$

$$\left. \left. - \frac{(R1_{X,Y}\|RP1 + R2_{X,Y}\|RP2 + Rs1)\|(Rv\|Rv1 + Rvs)}{(R1_{X,Y}\|RP1 + R2_{X,Y}\|RP2 + Rs1)\|(Rv\|Rv1 + Rvs) + (R3_{X,Y}\|RP3 + R4_{X,Y}\|RP4 + Rs2)} (RP3\|R3_{X,Y} + Rs2) \cdot (I_{EX}) \right| \cdot gain + VRef \right] - VRef2 = Vout_{X,Y}$$

FIG. 9

FLEXIBLE BRIDGE SENSOR ELECTRONIC ARCHITECTURE AND METHOD FOR IMPLEMENTING SAME

FIELD OF THE DISCLOSURE

The disclosure relates generally to sensors and associated sensor circuits that require differential outputs. The disclosure further relates generally to sensors, such as pressure sensors, and associated sensor circuits for industrial applications, such as aerospace applications, that require millivolt (mV) differential outputs. More particularly, the disclosure relates to sensors and associated sensor circuits and methods for achieving any mV or voltage output with full-scale and compensating the sensors to be fully-functional over a wide operating temperature range using active electronics.

BACKGROUND OF THE DISCLOSURE

Pressure sensing plays a critical role in the design of many systems across the industrial, automotive, oil and gas, aviation, and/or like industries. In particular, pressure sensors in the aerospace industry can be found in various applications, such as monitoring engine oil pressure, bleed air pressure, cabin pressure, landing gear system pressure, and other specialized application pressures. In general, a pressure sensor converts a physical pressure contained within a localized region of interest to a measurable quantity, such as the change in resistance of a Wheatstone bridge, variations in the capacitance, optical interference, etc. In a conventional Wheatstone bridge configuration, four resistive elements are located on a pressure sensitive diaphragm and are strategically placed based on a local strain profile of the pressure sensitive diaphragm exposed to a pressure media. As the pressure applied to the pressure sensitive diaphragm varies, the strain sensitive elements exhibit changes in their nominal resistive values. This resistive bridge is excited by a voltage or current source and a measurable differential voltage at the resistive bridge's output terminals can be either measured directly, or connected to analog or digital electronic circuitry to perform signal conditioning and amplification to the desired full-scale output value (i.e. 0 to 100 mV, 0 to 10 volts (V), 4-20 milli-amps (mA), etc.). Furthermore, temperature compensation in any sensor configuration is required to correct for changes in output signal sensitivity and offset due to exposure to variations in operating temperature. This can be carried out by using passive resistive compensation devices across the bridge elements, or by using advanced digital compensation mechanisms such as look-up tables or software polynomial correction algorithms.

The sensitivity of a typical native Wheatstone bridge sensing element when excited by an electrical source is defined in terms of mV per volt excitation (mV/V) across the bridge. Electrical excitation of a typical Wheatstone bridge sensing element results in a differential voltage in the mV range that increases in magnitude as pressure is applied. The sensing element sensitivity magnitude varies across different sensor technologies, such as those based on bulk silicon semiconductor resistors, thin film resistors, etc., and will always require some form of output signal modification, such as scaling, compensation, and/or the like. In general, the electrical output signal from the sensor is measured directly from the Wheatstone bridge and therefore the full-scale operating mV output is determined solely by the sensing technology chosen, keeping in mind the proof and burst pressure requirement of the selected sensing element.

Additionally, the discrete resistive compensation network used to perform output scaling and temperature effect correction will need to be taken into consideration, which will always reduce the output span. For example, an un-compensated silicon pressure sensing element having an initial sensitivity of 20 mV/V, will have a full-scale output of 200 mV at 10 V excitation. Assuming the resistive compensation network drops the overall sensitivity to 15 mV/V, the resulting maximum full-scale output that can be achieved is 150 mV. If a sensor requiring a differential 250 mV full-scale value is required, the only options to achieve this design target include over pressuring or over exciting the sensor, either case is un-desirable.

Typically, in existing design solutions, after sensor data has been collected, external compensation discrete resistor values must be calculated. Thereafter, external compensation discrete resistors are implemented, for example manually soldered, into the sensing element network by an operator. This method is undesirable and not practical in that a large stock of resistors having various resistor values must be kept in inventory in order to cover a large range of compensation resistance for each resistive network. Furthermore, exact resistance values (for example, having milli-ohm (mΩ) resolution) can only be achieved by implementing large resistor networks that include a plurality of series and/or parallel discrete resistors. An additional disadvantage to this method is that it is slow and costly. For example, the method requires a large amount of labor hours due to it being a manual process. An alternative method that has been utilized involves using laser trimmable resistors to create the desired resistance value without the need to stock a large number of different discrete resistive values. However, this alternative method can be unsatisfactory as further described herein.

Accordingly, what is needed is a sensor and/or sensor circuitry that can be scaled to any desired electronic output, offset compensated, and temperature compensated. Additionally, what is needed is a sensor and/or sensor circuitry that can be scaled to any desired electronic output, offset and span compensated, and temperature compensated as well as having decreased manufacturing costs, reduced manufacturing complexity, reduced yield loss, decreased manufacturing time, and/or the like.

SUMMARY OF THE DISCLOSURE

One aspect includes a sensor circuit architecture that includes: a Wheatstone bridge-type sensing element that includes a plurality of resistors; a plurality of equivalent compensation networks; each of the plurality of resistors includes one of the plurality of equivalent compensation networks; each of the plurality of equivalent compensation networks includes at least one digital resistive compensation network configured to provide at least one of the following: variable resistance, digitally controlled variable resistance, digitally controlled resistance, and/or digitally set resistance; the at least one digital resistive compensation network includes one or more digital resistive devices and one or more passive resistive devices; and the one or more digital resistive devices are configured to be digitally programmable in pre-defined resistive steps, resistance values, and/or resistance amounts, where the sensor circuit architecture is configured with the at least one digital resistive compensation network to implement at least one of the following: a desired scale of output, a desired offset compensation, and/or a desired temperature compensation.

One aspect includes a method of implementing sensor circuit architecture that includes: providing a Wheatstone bridge-type sensing element that includes a plurality of resistors; providing a plurality of equivalent compensation networks; configuring each of the plurality of resistors with one of the plurality of equivalent compensation networks; configuring each of the plurality of equivalent compensation networks with at least one digital resistive compensation network configured to provide at least one of the following: variable resistance, digitally controlled variable resistance, digitally controlled resistance, and/or digitally set resistance; configuring the at least one digital resistive compensation network with one or more digital resistive devices and one or more passive resistive devices; and configuring the one or more digital resistive devices to be digitally programmable in pre-defined resistive steps, resistance values, and/or resistance amounts, where the sensor circuit architecture is configured with the at least one digital resistive compensation network to implement at least one of the following: a desired scale of output, a desired offset and span compensation, and/or a desired temperature compensation.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the disclosure. It is important, therefore, that the claims be regarded as including such equivalent constructions insofar as they do not depart from the spirit and scope of the disclosure.

BRIEF DESCRIPTION OF THE DRAWINGS

The foregoing and other features and advantages of the disclosure should be more fully understood from the accompanying detailed description of illustrative embodiments taken in conjunction with the following Figures in which like elements are numbered alike in the several Figures:

FIG. 8 shows exemplary equations that may be used to solve for the bridge resistors, here shown at one temperature and one pressure in accordance with one embodiment of this disclosure.

FIG. 9 shows exemplary equations that may be used to solve for the compensation resistors, here shown at one temperature and one pressure in accordance with one embodiment of this disclosure.

DETAILED DESCRIPTION

As discussed hereinafter and in accordance with the disclosure, an electronic architecture is provided, wherein an output of a sensor is temperature compensated and scaled to any desired electronic output, thereby allowing for a flexible means of performing automated end-of-line (EOL) calibration without the need for an operator to manually perform the compensation.

Figure 1:
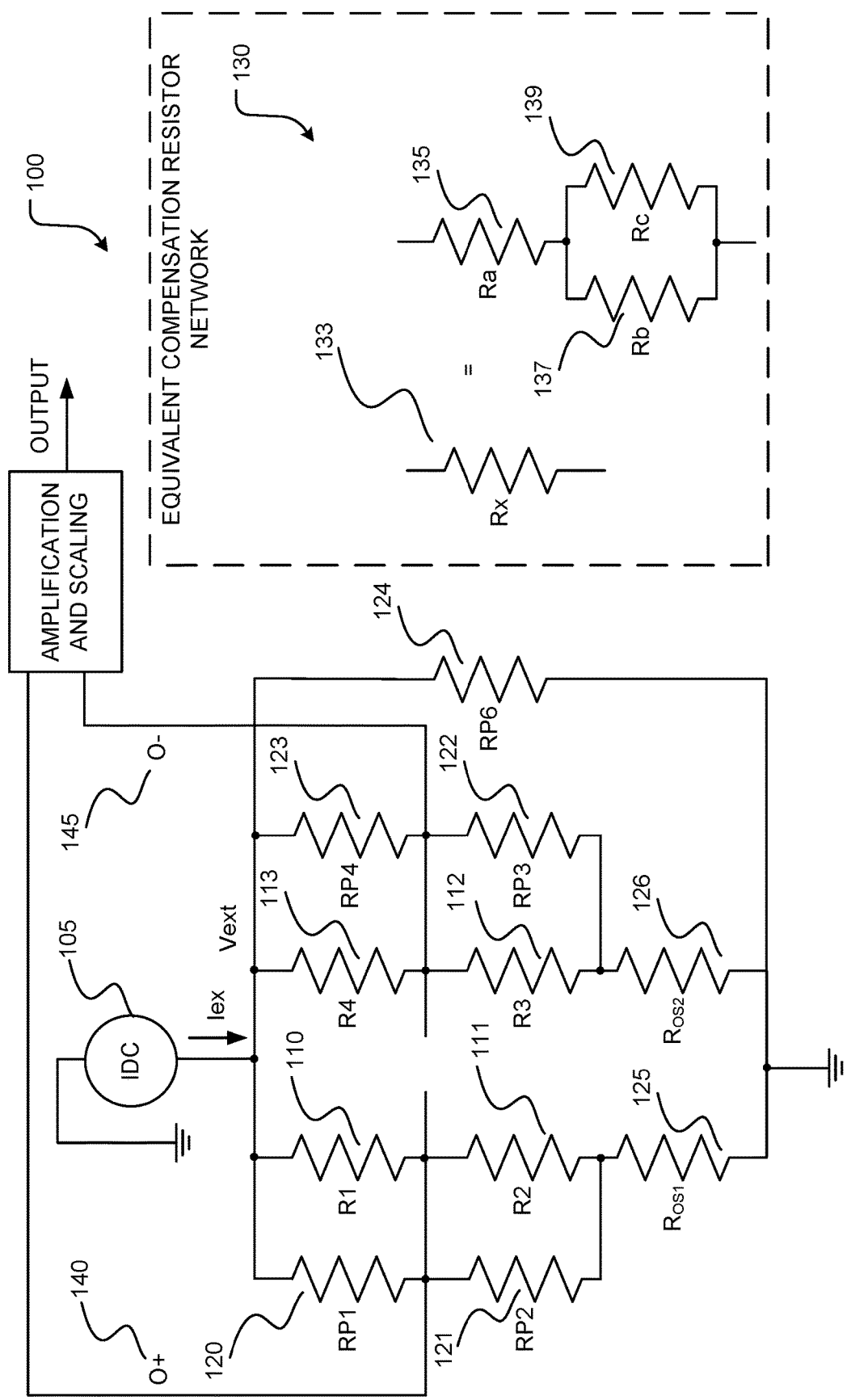
FIG. 1 illustrates a block diagram of a Wheatstone bridge sensor configuration using current excitation and laser trim resistors.

FIG. 1 illustrates a block diagram of a Wheatstone bridge sensor configuration using current excitation and laser trim resistors.

Referring to FIG. 1, a passive resistive compensation architecture 100 in constant current mode is shown. The passive resistive compensation architecture 100 includes a resistor R1 110, a resistor R2 111, a resistor R3 112, and a resistor R4 113 that represent four resistances of a sensing element bridge network. The resistor R1 110, the resistor R2 111, the resistor R3 112, and the resistor R4 113 may be excited by a constant current source 105.

In parallel with each bridge resistor (the resistor R1 110, the resistor R2 111, the resistor R3 112, and the resistor R4 113) of the passive resistive compensation architecture 100 are parallel compensation resistances illustrated as a resistor RP1 120, a resistor RP2 121, a resistor RP3 122, and a resistor RP4 123. In this regard, the parallel compensation resistances may have temperature coefficients <10% of the bridge resistance coefficients.

The passive resistive compensation architecture 100 may further include one or more offset compensation resistors. As illustrated in FIG. 1, the passive resistive compensation architecture 100 may include an offset compensation resistor $R_{OS1}$ 125 and an offset compensation resistor $R_{OS2}$ 126 that may be used to balance a zero-pressure offset reading to a desired value. The passive resistive compensation architecture 100 may further include a compensation resistor RP6 124 that may be used to set a span by shunting current from the sensing bridge.

Here, it is noteworthy to mention that all external compensation resistors mentioned can be derived from a combination of a series and/or a parallel resistive network. In this regard, one such example is shown in FIG. 1 in inset 130. In particular, a resistor Ra 135, a resistor Rb 137, and a resistor Rc 139 are used to create equivalent resistance as that of resistor Rx 133. In this regard, the disclosure is meant to include any circuits and/or components that may provide equivalent electrical performance.

Figure 2:
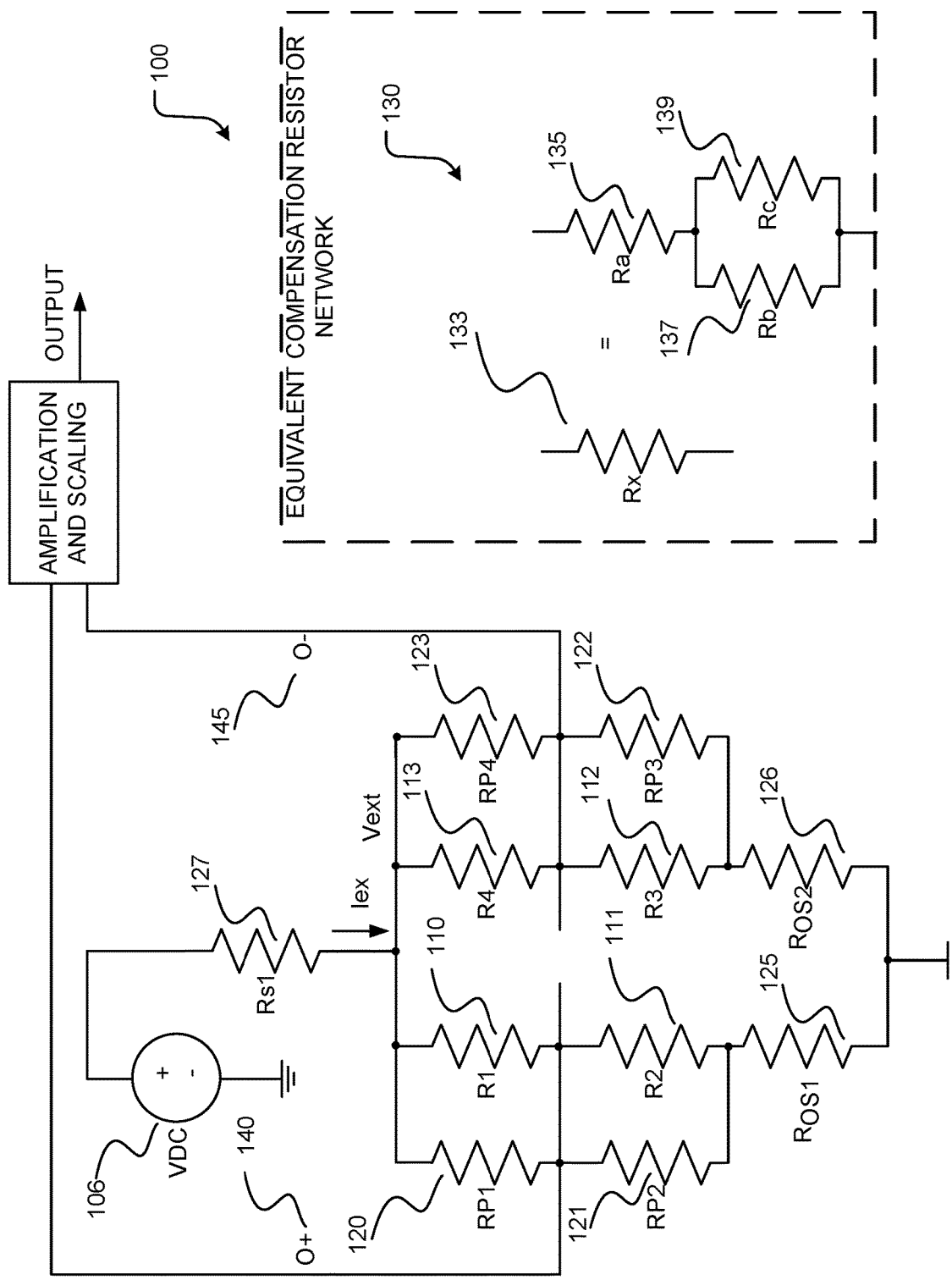
FIG. 2 illustrates a block diagram of a Wheatstone bridge sensor configuration using voltage excitation and laser trim resistors.

FIG. 2 illustrates a block diagram of a Wheatstone bridge sensor configuration using voltage excitation and laser trim resistors.

In this regard, a similar configuration of the passive resistive compensation architecture 100 of FIG. 1 is shown in FIG. 2. In this arrangement of the passive resistive compensation architecture 100, the sensing bridge is excited in constant voltage mode by a constant voltage source VDC 106. In this configuration, a resistive network Rs1 127 may be used to compensate for the span.

Additionally, the passive resistive compensation architecture 100 of FIG. 1 and FIG. 2 requires calibration. In this regard, a calibration method for the passive resistive compensation architecture 100 may require various operations to provide discrete resistive components, for example manually solder discrete resistive components on and off the printed circuit board as described above. Alternatively, a sophisticated laser trimming system may be utilized in order to trim to the desired resistance. While this method provides a suitable solution and is able to achieve suitable compensation resistor values, the passive resistive compensation architecture 100 must still be manually handled in order to probe the resistors for measurement during the laser trimming process. Furthermore, active laser trimming over temperature is difficult to do.

The disclosure addresses the deficiencies of the implementations described in the background, FIG. 1, FIG. 2, and/or the like. In particular, the disclosure sets forth circuits, architecture, and methods that not only can provide temperature compensation, which can be realized without the manual intervention during the calibration and temperature compensation process, such as laser trimming, but it also allows for achieving any polarity zero offset and full-scale voltage value (within the limits defined by the fixed analog components as part of the design process).

Moreover, it should be appreciated that not only do most pressure sensor calibration electronic architectures involve complex digital and/or software systems, but they do not allow for freedom in customizing the full-scale value and resolution in the compensating trimming schemes required to achieve these. For example, most electronic bridge signal conditioning devices provide an analog voltage output from just below the supply voltage rail down to the minimum output voltage swing of the driving amplifier, which typically can be between 50 mV and 100 mV (which includes noise and instability). However, a design requirement necessitating a compensated span from, for example, 2 mV to 350 mV would not be achievable with existing active electronic system-on-chip (SOC) devices.

The disclosure alleviates the above-mentioned limitations by using an active electronic architecture incorporating digitally programmable electronics along with analog circuitry and passive temperature dependent resistive devices for compensation of the sensor signal span, offset and temperature effects. Employing the use of digitally controlled resistive devices in the compensation network for span, offset and/or temperature effects eliminates the need to manually handle the device during the calibration process and provides the ability to implement end-of-line calibration functionality to the manufacturing process. Eliminating manual operations during calibration not only speeds up the manufacturing time and reduces costs, but it also reduces the chance of scrap or yield loss. In this regard, manual operations may result in Electrostatic Discharge (ESD) damage as a result of bad ESD practices, may result in other manual manufacturing errors, such as incorrect laser trimming, which is irreversible, and other drawbacks related to manual operations. In particular, the disclosed devices and process result in decreased manufacturing costs, reduced manufacturing complexity, reduced yield loss, decreased manufacturing time, and/or the like.

Figure 3:
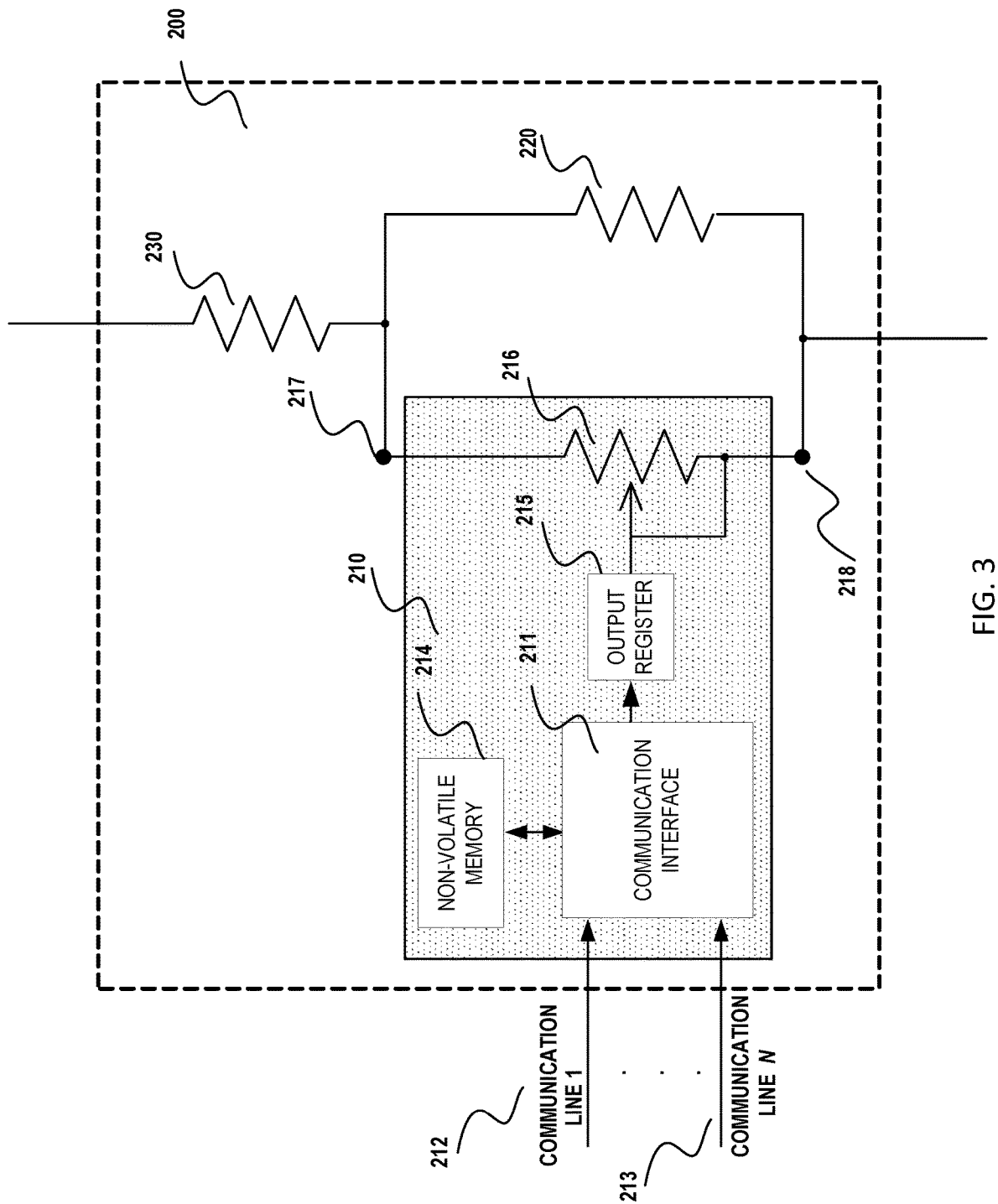
FIG. 3 illustrates a block diagram of an equivalent resistive network in accordance with one embodiment of this disclosure.

FIG. 3 illustrates a block diagram of an equivalent resistive network in accordance with one embodiment of this disclosure. In this regard, the equivalent resistive network can include discrete resistive devices, digital resistive devices, and temperature dependent resistive devices.

Referring to FIG. 3, a digital resistive compensation network 200 is illustrated that may be utilized in various sensor circuits and/or sensor electronic architectures described in the disclosure. The digital resistive compensation network 200 may be configured to provide variable resistance, digitally controlled variable resistance, digitally controlled resistance, digitally set resistance, and/or the like.

The digital resistive compensation network 200 may include one or more digital resistive devices 210 as shown along with one or more passive resistive devices in a series and/or a parallel combination. In this regard, the digital resistive compensation network 200 is shown implementing a digital resistive device 210 in parallel with a passive resistive device 220, all in series with a passive resistive device 230. Additionally, the digital resistive compensation network 200 may include a plurality of the digital resistive devices 210 arranged in series and/or in parallel. Other configurations providing equivalent resistance are contemplated as well by the disclosure. The passive resistive device 230 and the passive resistive device 220 may be either fixed in value or they may be temperature dependent. In one aspect, the passive resistive device 230 and the passive resistive device 220 may be temperature dependent to a greater extent than standard discrete resistors such that a resistive value has either a positive temperature coefficient (PTC) or a negative temperature coefficient (NTC). In one aspect, the passive resistive device 230 and/or the passive resistive device 220 may be implemented with one or more Positive Temperature Coefficient (PTC) thermistors.

The one or more digital resistive devices 210 may be digitally programmable in pre-defined resistive steps, resistance values, and/or resistance amounts. In this regard, the pre-defined resistive steps may be contingent upon a digital resolution of the architecture (i.e. 12-bit, 16-bit, 24-bit, etc.). The one or more digital resistive devices 210 may include a communication interface 211. The communication interface 211 may interface with one or more communication lines. The communication interface 211 and the one or more communication lines may be configured for wired communication and/or wireless communication. As illustrated in FIG. 3, the one or more communication lines may include a communication line 1 212 through communication line n 213. Where n is a whole number greater than one. It should be appreciated that the number of communication lines n may depend on a communication methodology employed, such as one-wire, Inter-Integrated Circuit (I$^2$C), Serial Peripheral Interface (SPI), etc.

The one or more digital resistive devices 210 may further include a non-volatile memory register 214 that may be configured to store digital resistor settings in a non-volatile manner. For example, the non-volatile memory register 214 may be configured to store digital resistor settings such that when in a power-down state, the digital resistor settings will not be lost and may be available on a power-on-reset event. The non-volatile memory register 214 may be implemented as a nonvolatile memory cell, a random-access memory (RAM), a read-only memory (ROM), an erasable ROM (EPROM), and/or the like.

In the power-on-reset state, the digital information stored in the non-volatile memory register 214 may be available at an output register 215. In one aspect, the output register 215 may generate a desired resistive value by indexing a discrete resistor ladder or similar digitally configurable implementation of the resistive network 216. The resistive value of the resistive network 216 may appear across a terminal 217 and a terminal 218. Additionally or alternatively, the resistive network 216 may be implemented utilizing other components to implement variable, settable, modifiable, and/or adjustable resistance including one or more of adjustable resistors, potentiometers, and/or the like.

The communication interface 211 may be configured to transfer the digital resistor settings stored in the non-volatile memory register 214 and provide the digital resistor settings to the output register 215 for implementation of the resistive network 216. Alternatively, the non-volatile memory register 214 may provide the digital resistor settings to the output register 215 through one or more intervening components for implementation of the resistive network 216. Alternatively, the non-volatile memory register 214 may provide the digital resistor settings directly to the output register 215 for implementation of the resistive network 216.

The communication interface 211 may be configured to receive on the one or more communication lines instructions, data, and/or the like. In one aspect, the communication interface 211 may be configured to receive on the one or more communication lines instructions, data, and/or the like during a setup process, a compensation process, and/or the like. The communication interface 211 may be configured to receive on the one or more communication lines instructions, data, and/or the like from an internal device and/or an external device.

In one aspect, the communication interface 211 may receive the digital resistor settings. In one aspect, the communication interface 211 may receive instructions for storing digital resistor settings in the non-volatile memory register 214, instructions for updating digital resistor settings in the non-volatile memory register 214, instructions for erasing digital resistor settings in the non-volatile memory register 214, instructions for implementing digital resistor settings in the non-volatile memory register 214, and/or the like.

Figure 4:
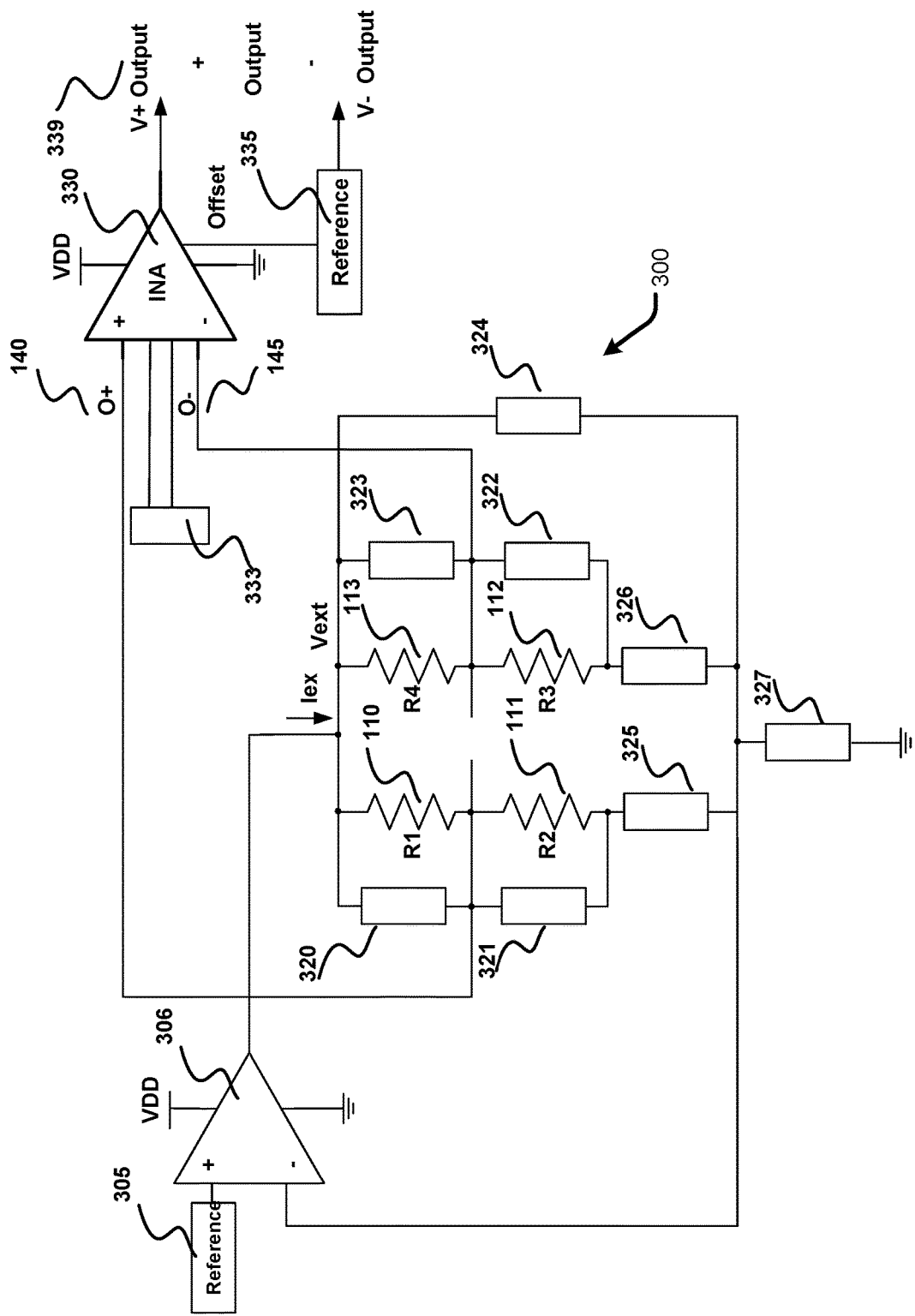
FIG. 4 illustrates an electronic architecture interfacing with a Wheatstone bridge-type sensing element with resistors, which is operating in constant current mode in accordance with one embodiment of this disclosure.

FIG. 4 shows an electronic architecture interfacing with a Wheatstone bridge-type sensing element with resistors in accordance with one embodiment of this disclosure which is operating in constant current mode. The aspects of FIG. 4 as illustrated and described below may include any one or more features of the disclosure. Additionally, the various features of FIG. 4 as illustrated and described below may be implemented in any other aspects of the disclosure. Referring to FIG. 4, an electronic architecture 300 interfacing with a Wheatstone bridge-type sensing element with the resistor R1 110, the resistor R2 111, the resistor R3 112 and the resistor R4 113 is shown in accordance with one embodiment of the disclosure which is operating in constant current mode. In this regard, one of the resistor R1 110, the resistor R2 111, the resistor R3 112 and the resistor R4 113 may be associated with a sensor and/or may be implemented as a sensor. The sensor may be a pressure sensor, a strain gauge, a strain gauge pressure sensor, and/or any other type of sensor sensing an environmental condition and changing electrical characteristics, such as resistance, in response to a change in the environmental condition. In particular, the disclosure references an implementation of a pressure sensor. However, the various features of the disclosure are equally applicable to other types of sensors. The above-noted constant current source may include a stable voltage reference source 305, an amplifier 306, and/or a current sense resistive network 327. However, other constant current methods and configurations are contemplated and may be used in aspects of the disclosure to achieve the same desired result.

With further reference to FIG. 4, equivalent compensation networks for the bridge resistors (the resistor R1 110, the resistor R2 111, the resistor R3 112, and the resistor R4 113) may include an equivalent compensation network 320, an equivalent compensation network 321, an equivalent compensation network 322, and/or an equivalent compensation network 323.

Additionally, the electronic architecture 300 may include an equivalent compensation network 325 and an equivalent compensation network 326 for adjusting an offset. Moreover, the electronic architecture 300 may include a compensation network 324 for adjusting the span.

One or more of the equivalent compensation network 320, the equivalent compensation network 321, the equivalent compensation network 322, the equivalent compensation network 323, the compensation network 324, the equivalent compensation network 325 and/or the equivalent compensation network 326 may each be implemented with a circuit and/or architecture consistent with the digital resistive compensation network 200 shown in FIG. 3 and may include at least one the implementation of the digital resistive device 210 in combination with one or more discrete resistive devices and/or a thermally dependent resistive device. In a similar fashion, a current sense resistive network 327 may also be configured in a manner similar to the digital resistive compensation network 200 illustrated in FIG. 3. In aspects, a thermally resistive device may be part of the compensation network 324 which aids in compensating the span for thermal effects.

Moreover, the electronic architecture 300 may include an output O+ 140 and an output O− 145 that may represent the differential signal. In this regard, the differential signal may be in the mV range, which is proportional to the sensor output. The differential signal may be sent to an instrumentation amplifier, other amplification device, signal processing device, and/or the like referenced hereinafter as a signal processing device 330. The signal processing device 330 may perform scaling of the differential signal as represented by the output O+ 140 and the output O− 145. A gain of the signal processing device 330 may be set by an equivalent resistive network 333. In this regard, the equivalent resistive network 333 may be implemented consistent with the digital resistive compensation network 200 described herein and illustrated in FIG. 3. Additionally, the signal processing device 330 may utilize a voltage reference 335 to set the offset voltage of an output voltage 339. The output voltage 339 may be represented as a single-ended voltage, as a differential signal with respect to the voltage reference 335, and/or the like.

Accordingly, the electronic architecture 300 may implement one or more of the digital resistive compensation networks 200. The implementation of the digital resistive compensation networks 200 within the electronic architecture 300 allows for precise and select adjustment of resistance values through the electronic architecture 300. This precise and select adjustment allows for obtaining a desired scale of output, a desired offset compensation, and/or a desired temperature compensation.

More specifically, the electronic architecture 300 is configured to provide a desired scale of output that results in an unexpected and/or improved performance in comparison to previous implementations. Additionally, the electronic architecture 300 is configured to provide a desired offset compensation that results in an unexpected and/or improved performance in comparison to previous implementations. Moreover, the electronic architecture 300 is configured to provide a desired temperature compensation for sensor measurements that results in an unexpected and/or improved performance in comparison to previous implementations.

Additionally, the electronic architecture 300 may include or may be mounted on a substrate. The substrate may include one of the following: a printed circuit board (PCB) component, a ceramic component, a glass component, a low temperature co-fired ceramic (LTCC) component, a high temperature co-fired ceramic (HTCC) component, a thick film substrate component, and/or the like. Additionally, various components in the electronic architecture 300 may connect with one another, may connect directly with one another, may connect with intervening components, and/or the like. Moreover, the various components in the electronic architecture 300 may connect with an adhesive, soldering, sintering, eutectic bonding, thermal compression bonding, ultrasonic bonding/welding, a clip component, a wire, a trace, a via, and/or the like.

Figure 5:
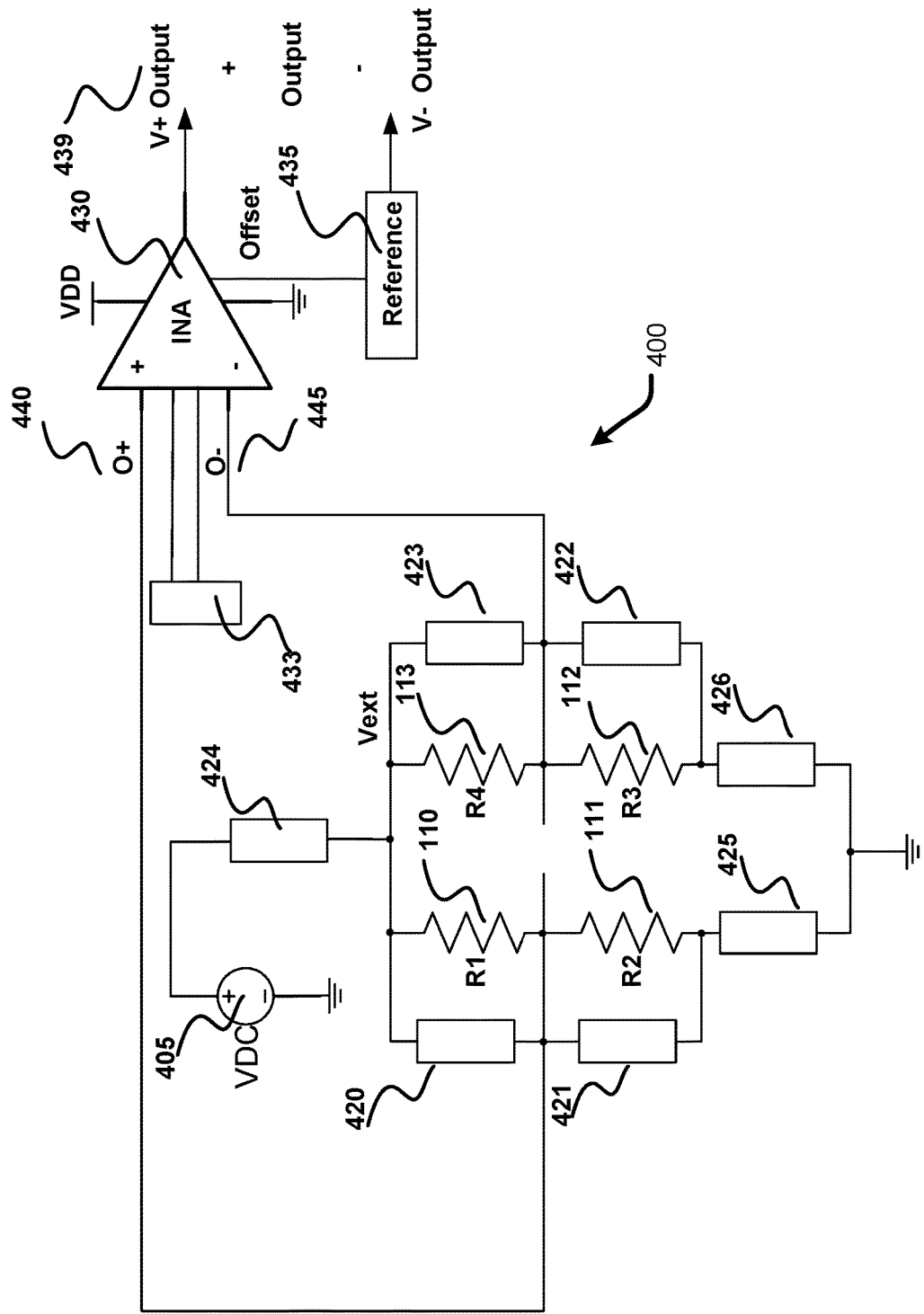
FIG. 5 illustrates an electronic architecture interfacing with a Wheatstone bridge-type sensing element with resistors, which is operating in constant current voltage mode in accordance with one embodiment of this disclosure.

FIG. 5 illustrates an electronic architecture interfacing with a Wheatstone bridge-type sensing element with resistors, which is operating in constant current voltage mode in accordance with one embodiment of this disclosure. The aspects of FIG. 5 as illustrated and described below may include any one or more features of the disclosure. Additionally, the various features of FIG. 5 as illustrated and described below may be implemented in any other aspects of the disclosure.

Referring to FIG. 5, an electronic architecture 400 interfacing with a Wheatstone bridge-type sensing element with resistors includes the resistor R1 110, the resistor R2 111, the resistor R3 112, and the resistor R4 113 as shown in accordance with one embodiment of the disclosure. In particular, the electronic architecture 400 is operating in constant voltage mode excited by a voltage source 405.

Additionally, the electronic architecture 400 includes equivalent compensation networks for bridge resistors that include the resistor R1 110, the resistor R2 111, the resistor R3 112, and the resistor R4 113. The equivalent compensation networks include an equivalent compensation network 420, an equivalent compensation network 421, an equivalent compensation network 422, and an equivalent compensation network 423. Additionally, the electronic architecture 400 includes a compensation network 425 and a compensation network 426 for adjusting the offset; and the electronic architecture 400 includes a series compensation network 424 for the span.

One or more of the equivalent compensation network 420, the equivalent compensation network 421, the equivalent compensation network 422, the equivalent compensation network 423, the compensation network 425, and the compensation network 426 may be implemented consistent with the digital resistive compensation network 200 described herein and illustrated in FIG. 3. Additionally, one or more of these implementations may include at least one of the digital resistive device 210 in combination with one or more discrete resistive devices and/or a thermally dependent resistive device. In one or more aspects, a thermally resistive device may be part of a series compensation network 424, which aids in compensating the span for thermal effects.

Moreover, the electronic architecture 400 may include an output O+ 440 and an output O− 445 that may represent the differential signal. In this regard, the differential signal may typically be in the mV range, which is proportional to the sensor output. The differential signal may be sent to an instrumentation amplifier, other amplification device, signal processing device, and/or the like referenced hereinafter as a signal processing device 430. The signal processing device 430 may perform scaling of the differential signal as represented by the output O+ 440 and the output O− 445. A gain of the signal processing device 430 may be set by an equivalent resistive network 433. In this regard, the equivalent resistive network 433 may be implemented consistent with the digital resistive compensation network 200 described herein and illustrated in FIG. 3. Additionally, the signal processing device 430 may utilize a voltage reference 435 to set the offset voltage of an output voltage 439. The output voltage 439 may be represented as a single-ended voltage, as a differential signal with respect to the voltage reference 435, or the like.

Accordingly, the electronic architecture 400 may implement one or more of the digital resistive compensation networks 200. The implementation of the digital resistive compensation networks 200 within the electronic architecture 400 allows for precise and select adjustment of resistance values through the electronic architecture 400. This precise and select adjustment allows for obtaining a desired scale of output, a desired offset compensation, and/or a desired temperature compensation.

More specifically, the electronic architecture 400 is configured to provide a desired scale of output that results in an unexpected and/or improved performance in comparison to previous implementations. Additionally, the electronic architecture 400 is configured to provide a desired offset compensation that results in an unexpected and/or improved performance in comparison to previous implementations. Moreover, the electronic architecture 400 is configured to provide a desired temperature compensation for sensor measurements that results in an unexpected and/or improved performance in comparison to previous implementations.

Figure 6:
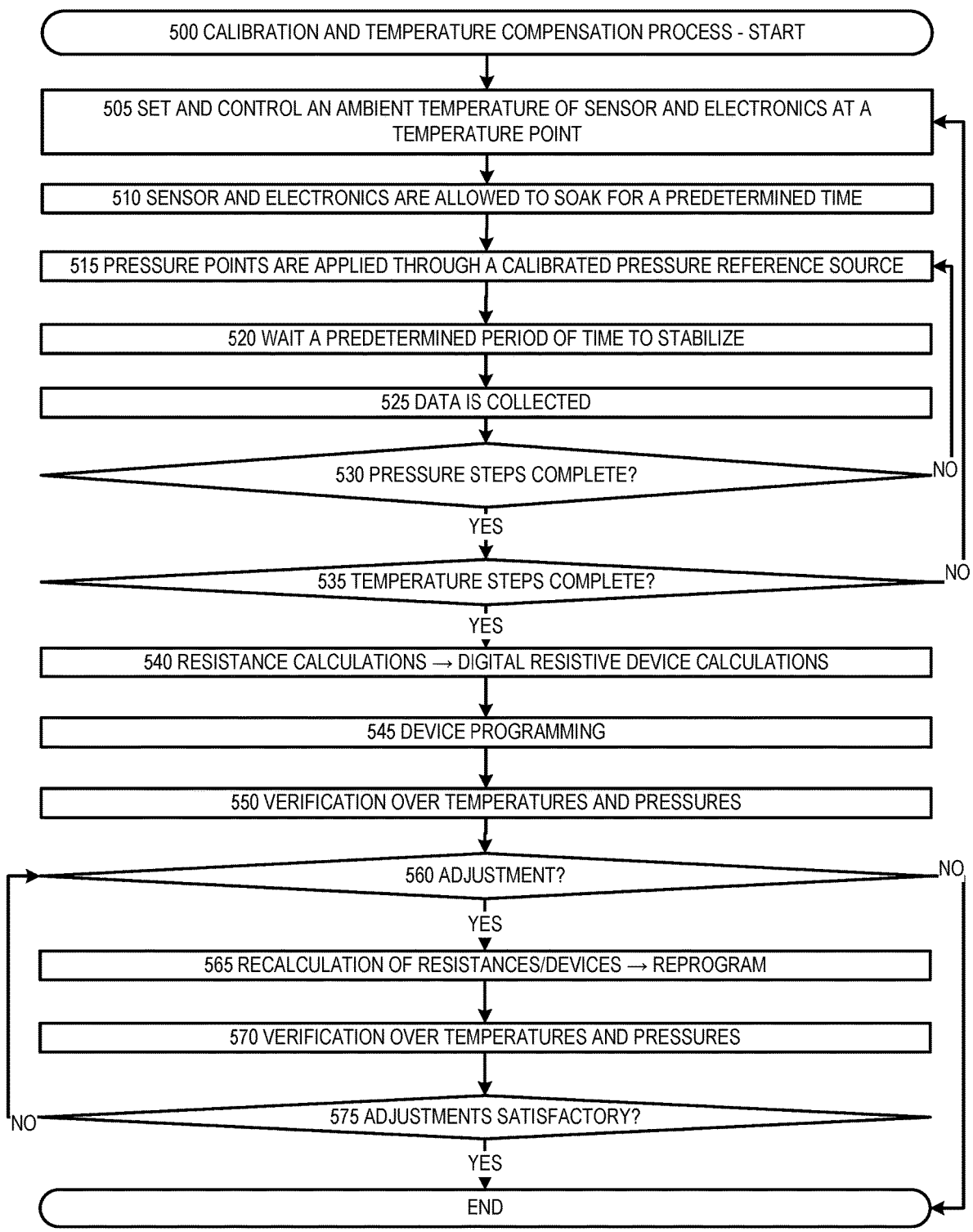
FIG. 6 illustrates a block diagram of an exemplary calibration and temperature compensation process in accordance with one embodiment of this disclosure.

FIG. 6 illustrates a block diagram of an exemplary calibration and temperature compensation process in accordance with one embodiment of this disclosure. In particular, FIG. 6 illustrates a calibration and temperature compensation process 500 implemented in conjunction with and/or related to the digital resistive compensation network 200, the electronic architecture 300, the electronic architecture 400, and/or a circuit configuration 600 as described herein. It should be noted that the aspects of the calibration and temperature compensation process 500 may be performed in a different order consistent with the aspects described herein. Moreover, the calibration and temperature compensation process 500 may be modified to have more or fewer processes consistent with the various aspects disclosed herein.

Figure 7:
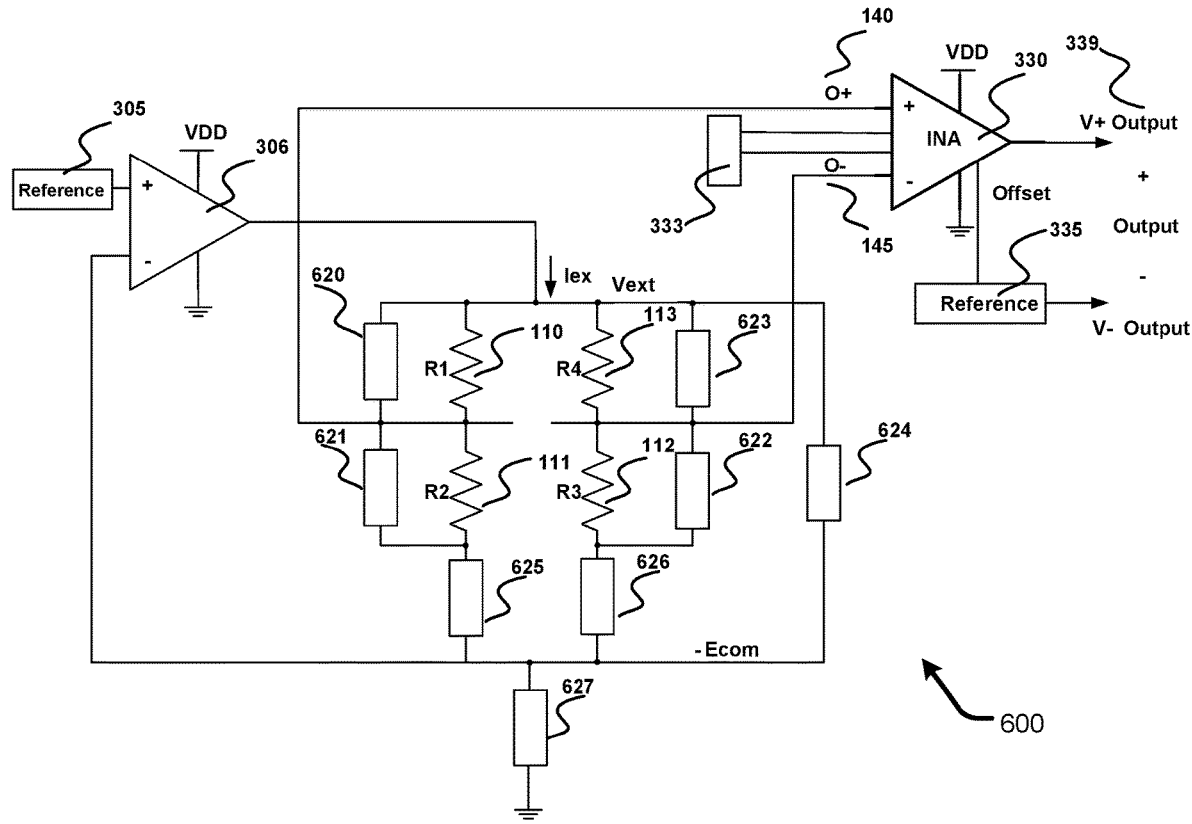
FIG. 7 shows a representative circuit for implementation of the temperature compensation process according to FIG. 6.

FIG. 7 shows a representative circuit for implementation of the temperature compensation process according to FIG. 6. The aspects of FIG. 7 as illustrated and described below may include any one or more features of the disclosure. Additionally, the various features of FIG. 7 as illustrated and described below may be implemented in any other aspects of the disclosure.

In one aspect, the calibration and temperature compensation process 500 may reference sensor and electronics and/or the circuit configuration 600 shown in FIG. 7. The circuit configuration 600 may operate in a constant current mode. The description which follows as part of the calibration and temperature compensation process 500 of FIG. 6 may be carried out to find optimal settings for one or more of a digital resistive device 620, a digital resistive device 621, a digital resistive device 622, a digital resistive device 623, a digital resistive device 624, a digital resistive device 625, a digital resistive device 626, a digital resistive device 627, and/or a digital resistive device 633 of FIG. 7 across the desired pressure and temperature ranges. Moreover, the calibration and temperature compensation process 500 of FIG. 6 may likewise be utilized in any one or more of the preceding circuit configurations disclosed herein and accordingly is described generically as sensor and electronics.

The calibration and temperature compensation process 500 may include a process to set and control an ambient temperature of the sensor and electronics at a temperature point 505; and the calibration and temperature compensation process 500 may include a process where the sensor and electronics are allowed to soak for a predetermined time 510. More specifically, a temperature chamber may be utilized in conjunction with the process. The temperature chamber may be configured such that it controls the ambient temperature of the sensor and electronics. This temperature may be set at a first temperature point and the sensor and electronics may be allowed to soak for a desired predetermined time to allow the sensor and electronics to reach thermal equilibrium.

The calibration and temperature compensation process 500 may include a process where pressure points are applied through a calibrated pressure reference source 515; and the calibration and temperature compensation process 500 may include a process to wait a predetermined period of time to stabilize 520. In particular, following temperature stabilization, one of a plurality of pressure points may be applied through a calibrated pressure reference source to the sensor and electronics and allowed to stabilize. For example, the predetermined period of time may be 10 seconds to 240 seconds, 10 seconds to 30 seconds, 30 seconds to 90 seconds, 90 seconds to 150 seconds, or 150 seconds to 240 seconds. Of course, other predetermined periods of time may be utilized and may be dependent on various configurations, applications, and/or the like.

The calibration and temperature compensation process 500 may include a process where data is collected 525. At each pressure and temperature index point, the various signal outputs from the sensor and electronics may be collected and correlated to a pressure index point, and a temperature index point. For example, at each pressure and temperature index point the voltages shown in a data collection matrix 650 illustrated in FIG. 7 may be collected from the sensor and electronics.

The calibration and temperature compensation process 500 may include a process to determine whether the pressure steps are complete 530. More specifically, the process may operate in a manner to test multiple pressures on the sensors and electronics. In this regard, the process may reiterate with each reiteration changing the pressure applied to the sensors and electronics. Accordingly, if the pressure steps are not complete, the process returns to box 515 where a different pressure is set, and the process is reiterated. On the other hand, if the pressure steps are complete, the process advances to box 535.

The calibration and temperature compensation process 500 may include a process to determine whether the temperature steps are complete 535. More specifically, the process may operate in a manner to test multiple temperatures on the sensors and electronics. In this regard, the process may reiterate with each reiteration changing the temperature applied to the sensors and electronics. For example, the desired pressure points for the first temperature are set, and the process is then iterated over the remaining temperature points. Accordingly, if the temperature steps are not complete, the process returns to box 505 and the temperature set process is reiterated with a different temperature. On the other hand, if the temperature steps are complete, the process advances to box 540.

The calibration and temperature compensation process 500 may include a process to perform Resistance Calculations→Digital Resistive Device Calculations 540. In this regard, once all the sensor outputs, such as voltages, are collected from the sensor and electronics for all desired pressure points and temperature points, the bridge resistances for each index point may be calculated, and then used to solve for optimal digital resistive device settings.

The calibration and temperature compensation process 500 may include a process of device programming 545; the calibration and temperature compensation process 500 may include a process of verification over temperatures and pressures 550; and the calibration and temperature compensation process 500 may include a process to determine adjustment 560. In particular, the sensor and electronics may be programmed with the optimal digital resistive device settings previously calculated. In particular, the optimal digital resistive device settings may be provided to the digital resistive device 620, the digital resistive device 621, the digital resistive device 622, the digital resistive device 623, the digital resistive device 624, the digital resistive device 625, the digital resistive device 626, the digital resistive device 627, and/or the digital resistive device 633 ("digital resistive devices") of the circuit configuration 600 illustrated in FIG. 7.

More specifically, each of the digital resistive devices may implement a circuit consistent with the digital resistive compensation network 200 illustrated in FIG. 3. In this regard, the optimal digital resistive device settings may be provided on the communication line 1 212 and/or the communication line n 213 to the digital resistive compensation network 200. The communication interface 211 may receive the optimal digital resistive device settings and provide these to the non-volatile memory register 214. The non-volatile memory register 214 may store the optimal digital resistive device settings; and that the non-volatile memory register 214 may provide the optimal digital resistive device settings to the output register 215. Thereafter, the output register 215 may utilize the optimal digital resistive device settings in the resistive network 216.

Once the programming of the sensor and electronics with the optimal digital resistive device settings is completed, a verification may be conducted. The verification may include operating the sensor and electronics at various pressures and/or various temperatures to ensure that the optimal digital resistive device settings provide the desired level of accuracy, a desired scale of output, a desired offset compensation, and/or a desired temperature compensation for sensor measurements. In this regard, if the sensor and electronics do not provide the desired values, then adjustment is needed and the process advances to box 565. Adjustment may then be carried out. On the other hand, if the sensor and electronics provide the desired values, then adjustment is not needed, and the process may end.

The calibration and temperature compensation process 500 may include a process for recalculation of resistances/device→reprogram 565. In particular, recalculation of resistances, recalculation of devices, and reprogramming may be implemented if adjustment is necessary. In this regard, the recalculation of resistances and the recalculation of devices may be implemented consistent with at least box 540 as described herein. Finally, the reprogramming may be implemented consistent with at least box 545 as described herein.

The calibration and temperature compensation process 500 may include a process of verification over temperatures and pressures 570. In particular, the devices may be verified over various temperatures and pressures. The verification may include operating the sensor and electronics at various pressures and/or various temperatures to ensure that the optimal digital resistive device settings provide the desired level of accuracy, a desired scale of output, a desired offset compensation, and/or a desired temperature compensation for sensor measurements.

The calibration and temperature compensation process 500 may include a process to determine whether the adjustments are satisfactory 575. If the various adjustments are satisfactory, the process will end. On the other hand, if additional process adjustments are necessary, the process may return to box 560 to reiterate the above-noted steps.

The resistances determined in the calibration and temperature compensation process 500 may be utilized for implementation and configuration of the electronic architecture 300, the electronic architecture 400, and/or the circuit configuration 600. For example, in the circuit configuration 600, the resistances determined in the calibration and temperature compensation process 500 may then be used to implement, program, and/or the like the digital resistive device 620, the digital resistive device 621, the digital resistive device 622, the digital resistive device 623, the digital resistive device 624, the digital resistive device 625, the digital resistive device 626, the digital resistive device 627, and/or the digital resistive device 633. Accordingly, the circuit configuration 600 is configured to provide a desired scale of output that results in an unexpected and/or improved performance in comparison to previous implementations. Additionally, circuit configuration 600 is configured to provide a desired offset compensation that results in an unexpected and/or improved performance in comparison to previous implementations. Moreover, circuit configuration 600 is configured to provide a desired temperature compensation for sensor measurements that results in an unexpected and/or improved performance in comparison to previous implementations.

It should be appreciated that this method applies for any circuit configuration disclosed or like implementation including the electronic architecture 300 and the electronic architecture 400. In this regard, the method should not be limited to that of the constant current network of FIG. 7.

The calibration and temperature compensation process 500 may be implemented at least in part with a testing device that may be used to physically acquire signals from the electronic architecture 300, the electronic architecture 400, and/or the circuit configuration 600. The testing device may be implemented, may be controlled, may control, and the like in conjunction with other dedicated hardware as defined herein. The testing device may be implemented, may be controlled, may control, and the like in conjunction with other computing devices as defined herein.

The testing device may utilize connectors, manipulators, or the like, which may allow a connection to the electronic architecture 300, the electronic architecture 400, and/or the circuit configuration 600. In one aspect, the connectors and/or manipulators may include the connectors implemented as needles that may be positioned in relation to the electronic architecture 300, the electronic architecture 400, and/or the circuit configuration 600 for capturing voltages, currents, and/or the like.

The testing device may include a processor, a temperature chamber, a power supply, a memory, a display, a read-only memory, an input device, an input/output device, an analog-to-digital converter, a digital to analog converter, a clock, one or more sensors, a power source, and the like.

The processor may be configured to process at least in part test processes, test functions, provide other test services, and/or implement the calibration and temperature compensation process 500. The temperature chamber may be a device or system to provide desired temperature-controlled environment for testing of the electronic architecture 300, the electronic architecture 400, and/or the circuit configuration 600. The temperature chamber may include a heating device, a heating device controller, a cooling device, a cooling device controller, a temperature sensor, and/or the like.

The heating device controller may be responsive to the temperature sensor to control the heating device to provide an elevated temperature environment for testing the electronic architecture 300, the electronic architecture 400, and/or the circuit configuration 600. The cooling device controller may be responsive to the temperature sensor to control the cooling device to provide a low temperature environment for testing the electronic architecture 300, the electronic architecture 400, and/or the circuit configuration 600.

The power source may be configured as a highly stable DC power source, a constant current source, a constant voltage source, a variable current source, a variable voltage source, and/or the like.

The one or more sensors may measure various device characteristics. In particular, one or more sensors may be implemented as one or more temperature sensors to measure a temperature of the electronic architecture 300, the electronic architecture 400, and/or the circuit configuration 600, measure a temperature of the temperature chamber, and/or the like. The one or more temperature sensors may be implemented as a Negative Temperature Coefficient (NTC) thermistor, a Positive Temperature Coefficient (PTC) thermistor, a Resistance Temperature Detector (RTD), a thermocouple, a semiconductor-based sensor, and/or the like. The one or more sensors may include one or more current sensors, one or more voltage sensors, and the like.

The testing device may implement instrument integration, communication, test protocols, test time, and/or the like by utilizing an on-board script processor. The testing device may allow user-defined on-board script execution for controlling test sequencing, test flow, decision making, instrument autonomy, and/or implementation of the calibration and temperature compensation process 500. The testing device may include contact check functionality to verify good connections to the electronic architecture 300, the electronic architecture 400, and/or the circuit configuration 600 under test before the test begins.

Additionally, the testing device may implement an operating system, a touchscreen controller, a communications component, a graphics component, a contact/motion component, and the like to provide full functionality. In particular, the processor may be configured to execute a software application configured to control the testing device to implement the calibration and temperature compensation process 500, as described herein.

In one aspect, the software application may be configured to interact with the one or more sensors and the like as described herein. In particular, the one or more sensors may provide signals to the processor.

FIG. 8 shows exemplary equations that may be used to solve for the bridge resistors, here shown at one temperature and one pressure in accordance with one embodiment of this disclosure. In particular, FIG. 8 shows the equations of the network shown in FIG. 7 to solve for the four bridge resistors that include the resistor R1 110, the resistor R2 111, the resistor R3 112, and the resistor R4 113. In this regard, utilizing the exemplary equations in FIG. 8, the values provided below are utilized to solve for resistance for the four bridge resistors that include the resistor R1 110, the resistor R2 111, the resistor R3 112, and the resistor R4 113. The values are as follows:

The variable R1 defines the left top leg of the bridge and is in units of ohms.

The variable R2 defines the left bottom leg of the bridge and is in units of ohms.

The variable R3 defines the right bottom leg of the bridge and is in units of ohms.

The variable R4 defines the right top leg of the bridge and is in units of ohms.

The variable RRef defines the resistor used to set the constant current value and is in units of ohms.

The variable VRef defines the reference voltage and is in units of volts.

The variable Vext defines the bridge excitation voltage and is in units of volts.

$$F(X, Y) = \left\|\left[(RP2\|R2_{X,Y} + Rs1) \cdot \right.\right.$$

$$\left\{ I_{EX} \cdot \frac{(R4_{X,Y}\|RP4 + R3_{X,Y}|}{(R4_{X,Y}\|RP4 + R3_{X,Y}\|RP3 + Rs2)|} - (RP3 \| R3_{X,Y} + Rs2) \cdot \right.$$
$$\left. \frac{|(Rv\|Rv1 + Rvs) +}{(R1_{X,Y}\|RP1 + R2_{X,Y}\|RP2 + Rs1)} \right\}$$

$$\left[ I_{EX} \cdot \frac{(R1_{X,Y}\|RP1 + R2_{X,Y}|}{|RP2 + Rs1)\|(Rv\|Rv1 + Rvs)} \cdot gain + \right.$$
$$\left. \frac{|RP2 + Rs1)\|(Rv\|Rv1 + Rvs) +}{(R3_{X,Y}\|RP3 + R4_{X,Y}\|RP4 + Rs2)} \right]$$

$$VRef \left.\right] - VRef2 = Vout_{X,Y}$$

FIG. 9 shows exemplary equations that may be used to solve for the compensation resistors, here shown at one temperature and one pressure in accordance with one embodiment of this disclosure. In particular, FIG. 9 shows the equation for the differential voltage signal of 600 used to solve for the compensation resistors, here shown at one temperature (X) and one pressure (Y) in accordance with one embodiment 600 of this disclosure operating in constant current mode. In particular, FIG. 9 shows a single equation representing $P_X$, $T_Y$, where X denotes the pressure index point and Y denotes the temperature index point. It is appreciated that the number of equations represented by the matrix $P_X$, $T_Y$, is solved simultaneously to minimize the error and optimize the settings for the digital devices.

In this regard, utilizing the exemplary equations in FIG. 9, the values provided below are utilized to solve for resistance for the compensation resistors implemented by the 300, the 400, and/or the 600 as described herein. The values are as follows:

The variables $R1_{X,Y}$, $R2_{X,Y}$, $R3_{X,Y}$ and $R4_{X,Y}$ define the four bridge resistances at temperature X and pressure Y, and is in units of Ohms, shown as 110, 111, 112 and 113, respectively, in 600 and are in units of ohms.

The variables RP1, RP2, RP3 and RP4 represent the calculated four parallel compensation resistances, as shown as 620, 621, 622 and 623, respectively, in 600 and are in units of ohms.

The variable $Vout_{XY}$ is the resulting differential voltage at pressure X and temperature Y, and is in units of volts.

The variables Rs1 and Rs2 represent the calculated compensation resistances used in series with each leg of the bridge, as shown as 625 and 626, respectively, in 600 and are in units of ohms.

The variables Rv, Rv1 and Rvs represent the calculated compensation resistances in parallel with the sensor bridge and are represented as network 624 in 600 and are in units of ohms. Here, it is appreciated that at least one of these resistances may be temperature dependent.

The variable $I_{EX}$ represents the excitation current which excites the sensor bridge and is in units of amps.

The variable gain represents the amplification factor which is applied to the sensor bridge.

The variable VRef defines the voltage reference used for the instrumentation amplifier 330 of 600 and is in units of volts.

The variable VRef2 is the voltage used to create the reference for the output differential signal and is in units of volts. VRef may or may not be equal to VRef2.

It should be noted that the equations described herein with reference, for example, to FIG. 8 and FIG. 9 are exemplary, and the device and process of the disclosure may be implemented utilizing modified equations consistent with the aspects implemented and/or other mathematical relationships consistent with the aspects implemented. The device and process of the disclosure may be implemented in a number of different sensors types. The sensor types may include a pressure sensor, a strain gauge, a strain gauge pressure sensor, or other type of sensor sensing a physical feature and changing electrical characteristics, such as resistance, in response to a change in the physical feature. In particular, the disclosure references an implementation of a pressure sensor. However, the various features of the disclosure are equally applicable to other types of sensors.

The device and process of the disclosure may be implemented in a number of different industrial applications. In particular, the device and process of the disclosure may be utilized in aircraft systems including flight control systems, landing gear systems, bleed systems, hydraulic systems, supplemental oxygen systems, fuel systems, power plant systems, ice protection (anti-icing and deicing) systems, cooling systems, environmental control systems, vacuum systems, fire protection systems, safety systems, and/or the like.

The device and process of the disclosure may be implemented in a hydraulic system, a fuel system, a fluid-based system, and/or the like to measure a characteristic of the system. In one aspect, the device and process of the disclosure may be implemented in a hydraulic system, a fuel system, a fluid-based system, and/or the like to measure a pressure characteristic of the system.

Accordingly, the disclosure has disclosed a sensor, sensor circuitry, and/or associated method using an active electronic architecture incorporating digitally programmable electronics along with analog circuitry and passive temperature dependent resistive devices for compensation of a sensor signal span, offset and temperature effects. As described, employing the use of digitally controlled resistive devices in the compensation network for span, offset and/or temperature effects has eliminated the need and/or greatly reduced the need to manually handle the device during the calibration process and has provided the ability to implement end-of-line calibration functionality to the manufacturing process. Eliminating and/or greatly reducing manual operations during calibration has not only been shown to speed up the manufacturing time and reduce costs, but has been shown to reduce scrap or yield loss. Accordingly, the disclosed devices and process result in decreased manufacturing costs, reduced manufacturing complexity, reduced yield loss, decreased manufacturing time, and/or the like.

Aspects of the disclosure have been described above with reference to the accompanying drawings, in which aspects of the disclosure are shown. It will be appreciated, however, that this disclosure may, however, be embodied in many different forms and should not be construed as limited to the aspects set forth above. Rather, these aspects are provided so that this disclosure will be thorough and complete, and will fully convey the scope of the disclosure to those skilled in the art. Additionally, the various aspects described may be implemented separately. Moreover, one or more the various aspects described may be combined. Like numbers refer to like elements throughout.

It will be understood that, although the terms first, second, etc. are used throughout this specification to describe various elements, these elements should not be limited by these terms. These terms are only used to distinguish one element from another. For example, a first element could be termed a second element, and, similarly, a second element could be termed a first element, without departing from the scope of the disclosure. The term "and/or" includes any and all combinations of one or more of the associated listed items.

The terminology used herein is for the purpose of describing particular aspects only and is not intended to be limiting of the disclosure. As used herein, the singular forms "a," "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Relative terms such as "below" or "above" or "upper" or "lower" or "top" or "bottom" may be used herein to describe a relationship of one element, layer or region to another element, layer or region as illustrated in the figures. It will be understood that these terms are intended to encompass different orientations of the device in addition to the orientation depicted in the figures.

In the drawings and specification, there have been disclosed typical aspects of the disclosure and, although specific terms are employed, they are used in a generic and descriptive sense only and not for purposes of limitation, the scope of the disclosure being set forth in the following claims.

Aspects of the disclosure may be implemented in any type of computing devices, such as, e.g., a desktop computer, personal computer, a laptop/mobile computer, a personal data assistant (PDA), a mobile phone, a tablet computer, cloud computing device, and the like, with wired/wireless communications capabilities via the communication channels.

Further in accordance with various aspects of the disclosure, the methods described herein are intended for operation with dedicated hardware implementations including, but not limited to, PCs, PDAs, semiconductors, application specific integrated circuits (ASIC), programmable logic arrays, cloud computing devices, and other hardware devices constructed to implement the methods described herein.

It should also be noted that the software implementations of the disclosure as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the disclosure is considered to include a tangible storage medium or distribution medium, as listed herein and including art-recognized equivalents and successor media, in which the software implementations herein are stored.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

While the disclosure has been described in terms of exemplary aspects, those skilled in the art will recognize that the disclosure can be practiced with modifications in the spirit and scope of the appended claims. These examples given above are merely illustrative and are not meant to be an exhaustive list of all possible designs, aspects, applications or modifications of the disclosure. In this regard, the various aspects, features, components, elements, modules, arrangements, circuits, and the like are contemplated to be interchangeable, mixed, matched, combined, and the like. In this regard, the different features of the disclosure are modular and can be mixed and matched with each other.

What is claimed is:

1. A sensor circuit architecture comprising:
   a Wheatstone bridge-type sensing element comprising a plurality of resistors;
   a plurality of equivalent compensation networks;
   each of the plurality of resistors being connected in parallel to one of the plurality of equivalent compensation networks;
   each of the plurality of equivalent compensation networks comprising at least one digital resistive compensation network configured to provide at least one of the following: variable resistance, digitally controlled variable resistance, digitally controlled resistance, and/or digitally set resistance;
the at least one digital resistive compensation network includes one or more digital resistive devices and one or more passive resistive devices; and
the one or more digital resistive devices are configured to be digitally programmable in pre-defined resistive steps, resistance values, and/or resistance amounts,
wherein the sensor circuit architecture is configured with the at least one digital resistive compensation network to implement at least one of the following: a desired scale of output, a desired offset compensation, and/or a desired temperature compensation.

2. The sensor circuit architecture according to claim 1 wherein the at least one digital resistive compensation network further includes:
a non-volatile memory register configured to store digital resistor settings; and
a resistive network configured to implement the digital resistor settings responsive to the non-volatile memory register.

3. The sensor circuit architecture according to claim 2 wherein:
the at least one digital resistive compensation network includes a communication interface; and
the communication interface is configured to receive the digital resistor settings.

4. The sensor circuit architecture according to claim 3 wherein the at least one digital resistive compensation network further includes:
a non-volatile memory register configured to store digital resistor settings;
an output register configured to receive the digital resistor settings stored in the non-volatile memory register; and
a resistive network configured to implement the digital resistor settings responsive to the output register.

5. The sensor circuit architecture according to claim 1 further comprising:
an equivalent compensation network for adjusting an offset;
a compensation network for adjusting a span; and
a signal processing device configured to perform scaling of a differential output signal.

6. The sensor circuit architecture according to claim 1 wherein the one or more passive resistive devices comprise at least one of the following: a fixed value device or a temperature dependent value device.

7. The sensor circuit architecture according to claim 1 wherein the one or more passive resistive devices comprise a Positive Temperature Coefficient (PTC) thermistor.

8. The sensor circuit architecture according to claim 1 wherein the one or more passive resistive devices comprise a Negative Temperature Coefficient (NTC) thermistor.

9. The sensor circuit architecture according to claim 1 wherein the one or more passive resistive devices comprise a Resistance Temperature Detector (RTD).

10. A sensor system having the sensor circuit architecture according to claim 1 and further comprising:
at least one sensor connected to the sensor circuit architecture,
wherein the at least one sensor comprises at least one of the following: a pressure sensor, a strain gauge, and/or a strain gauge pressure sensor.

11. The sensor circuit architecture according to claim 1 wherein:

the sensor circuit architecture is configured to implement a desired scale of output;
the sensor circuit architecture is configured to implement a desired offset compensation; and
the sensor circuit architecture is configured to implement a desired temperature compensation.

12. A sensor system having the sensor circuit architecture according to claim 1 and further comprising:
a testing device configured to determine and program the sensor circuit architecture with digital resistor settings,
wherein the testing device includes at least one of the following: a processor, a temperature chamber, and one or more sensors.

13. A sensor system having the sensor circuit architecture according to claim 1 and further comprising a testing device configured to set and control a temperature of the sensor circuit architecture;
the testing device configured collect data from the sensor circuit architecture at a plurality of pressure and temperature index points; and
the testing device configured to determine and program the sensor circuit architecture with digital resistor settings,
wherein the testing device includes at least one of the following: a processor, a temperature chamber, and one or more sensors.

14. A method of implementing sensor circuit architecture comprising:
providing a Wheatstone bridge-type sensing element comprising a plurality of resistors;
providing a plurality of equivalent compensation networks;
configuring each of the plurality of resistors to be in parallel with one of the plurality of equivalent compensation networks;
configuring each of the plurality of equivalent compensation networks with at least one digital resistive compensation network configured to provide at least one of the following: variable resistance, digitally controlled variable resistance, digitally controlled resistance, and/or digitally set resistance;
configuring the at least one digital resistive compensation network with one or more digital resistive devices and one or more passive resistive devices; and
configuring the one or more digital resistive devices to be digitally programmable in pre-defined resistive steps, resistance values, and/or resistance amounts,
wherein the sensor circuit architecture is configured with the at least one digital resistive compensation network to implement at least one of the following: a desired scale of output, a desired offset compensation, and/or a desired temperature compensation.

15. The method of implementing sensor circuit architecture according to claim 14 further comprising configuring the at least one digital resistive compensation network to further include:
a non-volatile memory register storing digital resistor settings; and
a resistive network implementing the digital resistor settings responsive to the non-volatile memory register.

16. The method of implementing sensor circuit architecture according to claim 15 wherein:
the at least one digital resistive compensation network includes a communication interface; and
the communication interface is configured to receive the digital resistor settings.

17. The method of implementing sensor circuit architecture according to claim 16 wherein the at least one digital resistive compensation network further includes:
- a non-volatile memory register configured to store digital resistor settings;
- an output register configured to receive the digital resistor settings stored in the non-volatile memory register; and
- a resistive network configured to implement the digital resistor settings responsive to the output register.

18. The method of implementing sensor circuit architecture according to claim 14 further comprising:
- implementing an equivalent compensation network for adjusting an offset;
- implementing a compensation network for adjusting a span; and
- implementing a signal processing device configured to perform scaling of a differential output signal.

19. The method of implementing sensor circuit architecture according to claim 14 wherein the one or more passive resistive devices comprise at least one of the following: a fixed value device or a temperature dependent value device.

20. The method of implementing sensor circuit architecture according to claim 14 wherein the one or more passive resistive devices comprise a Positive Temperature Coefficient (PTC) thermistor.

21. The method of implementing sensor circuit architecture according to claim 14 wherein the one or more passive resistive devices comprise a Negative Temperature Coefficient (NTC) thermistor.

22. The method of implementing sensor circuit architecture according to claim 14 wherein the one or more passive resistive devices comprise a Resistance Temperature Detector (RTD).

23. The method of implementing sensor circuit architecture according to claim 14 and further comprising:
- implementing at least one sensor connected to the sensor circuit architecture,
- wherein the at least one sensor comprises at least one of the following: a pressure sensor, a strain gauge, and/or a strain gauge pressure sensor.

24. The method of implementing sensor circuit architecture according to claim 14 wherein:
- configuring the sensor circuit architecture to implement a desired scale of output; configuring the sensor circuit architecture to implement a desired offset compensation; and
- configuring the sensor circuit architecture to implement a desired temperature compensation.

25. The method of implementing sensor circuit architecture to claim 14 and further comprising:
- configuring a testing device to determine and program the sensor circuit architecture with digital resistor settings,
- wherein the testing device includes at least one of the following: a processor, a temperature chamber, and one or more sensors.

26. The method of implementing sensor circuit architecture to claim 14 and further comprising:
- setting and controlling a temperature of the sensor circuit architecture with a testing device;
- collecting data from the sensor circuit architecture with the testing device at a plurality of pressure and temperature index points;
- determining and programming the sensor circuit architecture with digital resistor settings utilizing the testing device; and
- the testing device may include a processor, a temperature chamber, and one or more sensors,
- wherein the sensor circuit architecture is configured to provide temperature compensation; and
- wherein the sensor circuit architecture is configured to achieve any polarity zero offset and full-scale voltage value.

* * * * *